US012652597B2

(12) United States Patent
Kim et al.

(10) Patent No.: US 12,652,597 B2
(45) Date of Patent: Jun. 9, 2026

(54) MOBILITY ENHANCEMENT IN WIRELESS COMMUNICATION SYSTEM

(71) Applicant: LG ELECTRONICS INC., Seoul (KR)

(72) Inventors: Hongsuk Kim, Seoul (KR); Sunghoon Jung, Seoul (KR); Myoungsoo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 872 days.

(21) Appl. No.: 17/934,005

(22) Filed: Sep. 21, 2022

(65) Prior Publication Data

US 2023/0337100 A1      Oct. 19, 2023

Related U.S. Application Data

(60) Provisional application No. 63/331,221, filed on Apr. 14, 2022.

(51) Int. Cl.
*H04W 36/32*          (2009.01)
*H04W 36/00*          (2009.01)

(52) U.S. Cl.
CPC ....... *H04W 36/32* (2013.01); *H04W 36/0016* (2013.01); *H04W 36/0083* (2013.01)

(58) Field of Classification Search
None
See application file for complete search history.

(56) References Cited

U.S. PATENT DOCUMENTS

| | | | | |
|---|---|---|---|---|
| 2019/0380081 | A1* | 12/2019 | Chang | H04W 36/0069 |
| 2022/0046491 | A1* | 2/2022 | Shrestha | H04W 36/0072 |
| 2022/0078684 | A1 | 3/2022 | Fehrenbach et al. | |
| 2022/0086711 | A1* | 3/2022 | Wang | H04W 36/249 |
| 2022/0408323 | A1* | 12/2022 | Ishii | H04W 36/0055 |

FOREIGN PATENT DOCUMENTS

| | | |
|---|---|---|
| EP | 3780742 | 2/2021 |
| WO | 2020-117118 | 6/2020 |
| WO | 2021-090626 | 5/2021 |

OTHER PUBLICATIONS

European Patent Office Application Serial No. 22197198.9, Search Report dated May 16, 2023, 15 pages.
Apple, "Consecutive Conditiona Handover," R2-1909862, 3GPP TSG-RAN WG2 Meeting #107, Aug. 2019, 4 pages.

(Continued)

*Primary Examiner* — Charles N Appiah
*Assistant Examiner* — Frank E Donado
(74) *Attorney, Agent, or Firm* — LEE, HONG, DEGERMAN, KANG & WAIMEY

(57) ABSTRACT

The present disclosure relates to a mobility enhancement in wireless communications. According to an embodiment of the present disclosure, a user equipment (UE) may perform an optimized mobility based on validity information informing which cells/mobility commands are valid for the optimized mobility. Therefore, the UE may identify one or more cells among all neighbor cells in a cell list to which optimized mobility is possible without receiving an additional signaling for the cell list, and prevent mobility failure caused by a mobility to a wrong cell.

15 Claims, 14 Drawing Sheets

(a)

(b)

(56)     References Cited

OTHER PUBLICATIONS

3rd Generation Partnership Project, "Technical Specification Group Radio Access Network; NR; Radio Resource Control (RRC) protocol specification (Release 16)," 3GPP TS 38.331 V16.7.0, Dec. 2021, 963 pages.
Mediatek, "New WID on Further NR mobility enhancements," RP-213565, 3GPP TSG RAN Meeting #94e, Electronic Meeting, Dec. 2021, 5 pages.

* cited by examiner

FIG. 1

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

MOBILITY ENHANCEMENT IN WIRELESS COMMUNICATION SYSTEM

CROSS-REFERENCE TO RELATED APPLICATION(S)

Pursuant to 35 U.S.C. § 119(e), this application claims the benefit of U.S. Provisional Patent Application No. 63/331,221, filed on Apr. 14, 2022, the contents of which are all hereby incorporated by reference herein in their entireties.

TECHNICAL FIELD

The present disclosure relates to a mobility enhancement in wireless communications.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In wireless communications, there may be some cases in which user equipment (UE) needs to perform a mobility. The mobility may comprise at least one of a primary cell (PCell) change, a primary secondary cell (PSCell) change or a PSCell addition. Since the mobility takes some time for various procedures, the mobility enhancement may be required.

SUMMARY

1. Technical Problem

An aspect of the present disclosure is to provide method and apparatus for a mobility enhancement in wireless communication systems.

2. Technical Solution

According to an embodiment of the present disclosure, a method performed by a user equipment (UE) configured to operate in a wireless communication system comprises:

receiving, from a network, i) a plurality of mobility commands for a mobility and ii) validity information informing whether each mobility command is valid for a next mobility after the mobility is completed, wherein each of the plurality of mobility commands is related to a corresponding target cell; performing a mobility to a first target cell, based on a mobility command related to the first target cell among the plurality of mobility commands; and after the mobility to the first target cell is completed: releasing one or more invalid mobility commands while maintaining one or more valid mobility commands, based on the validity information; and performing a mobility to a second target cell, based on a mobility command related to the second target cell among the one or more valid mobility commands.

According to an embodiment of the present disclosure, a user equipment (UE) configured to operate in a wireless communication system comprises: at least one transceiver; at least processor; and at least one computer memory operably connectable to the at least one processor and storing instructions that, based on being executed by the at least one processor, perform operations comprising: receiving, from a network, i) a plurality of mobility commands for a mobility and ii) validity information informing whether each mobility command is valid for a next mobility after the mobility is completed, wherein each of the plurality of mobility commands is related to a corresponding target cell; performing a mobility to a first target cell, based on a mobility command related to the first target cell among the plurality of mobility commands; and after the mobility to the first target cell is completed: releasing one or more invalid mobility commands while maintaining one or more valid mobility commands, based on the validity information; and performing a mobility to a second target cell, based on a mobility command related to the second target cell among the one or more valid mobility commands.

According to an embodiment of the present disclosure, a method performed by a network node related to a source cell in a wireless communication system comprises: transmitting, to a user equipment (UE), a measurement configuration; receiving, from the UE, a measurement report after transmitting the measurement configuration; determining to perform a mobility in which a plurality of target cells are candidates based on the measurement report; transmitting, to the plurality of target cells, a request message for the mobility; receiving, from the plurality of target cells, a response message for the request message comprising a plurality of mobility commands for the mobility, wherein each of the plurality of mobility commands is related to a corresponding target cell; and transmitting, to the UE, i) the plurality of mobility commands for the mobility and ii) validity information informing whether each mobility command is valid for a next mobility after the mobility is completed, wherein the UE is configured to perform a mobility to a first target cell, based on a mobility command related to the first target cell among the plurality of mobility commands, and wherein, after the mobility to the first target cell is completed, the UE is configured to: release one or more invalid mobility commands while maintaining one or more valid mobility commands, based on the validity information; and perform a mobility to a second target cell, based on a mobility command related to the second target cell among the one or more valid mobility commands.

3. Advantageous Effect

The present disclosure can have various advantageous effects.

For example, based on the validity information, the UE may identify one or more cells among all neighbor cells in a cell list to which optimized mobility is possible without receiving an additional signaling for the cell list.

For example, in case of conditional mobility, the UE may prevent mobility failure due to an optimized mobility to a wrong cell when the UE needs to perform a mobility before receiving an update from a network.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 1 shows an example of a communication system to which implementations of the present disclosure is applied.

FIG. 10 shows an example of a dual connectivity (DC) architecture to which technical features of the present disclosure can be applied.

DETAILED DESCRIPTION

Figure 2:
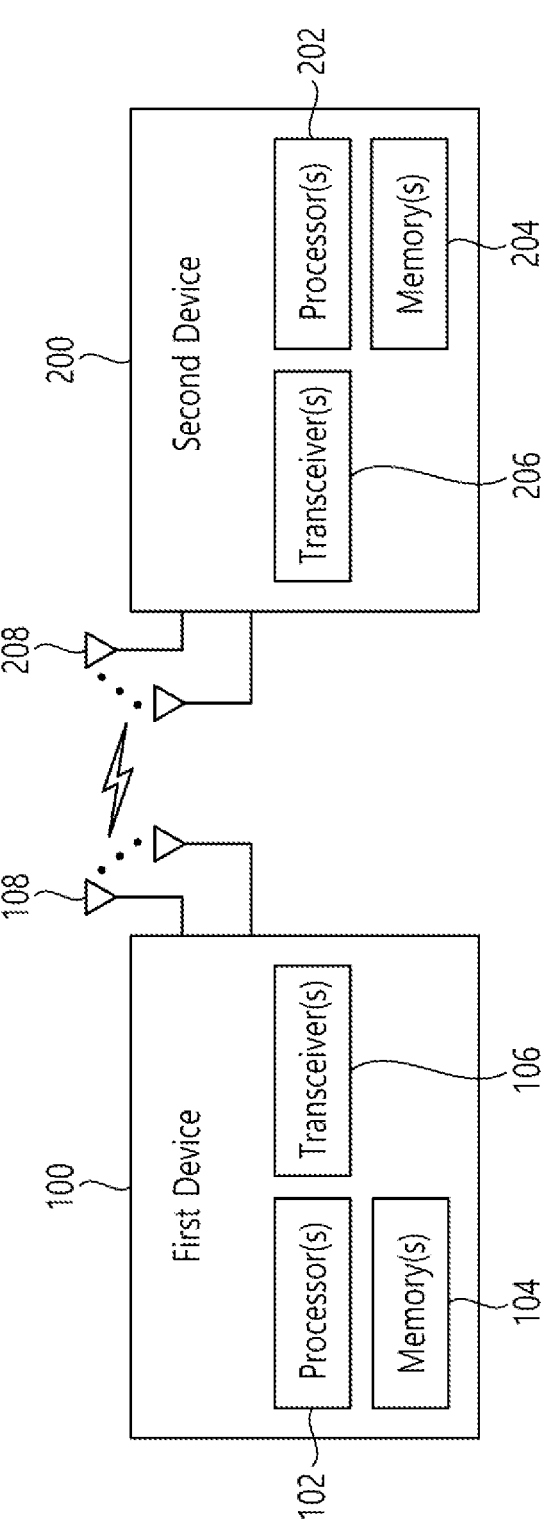
FIG. 2 shows an example of wireless devices to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality', 'channel state', 'channel quality', ' channel state/reference signal received power (RSRP)' and ' reference signal received quality (RSRQ)' may be used interchangeably.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

Figure 1:
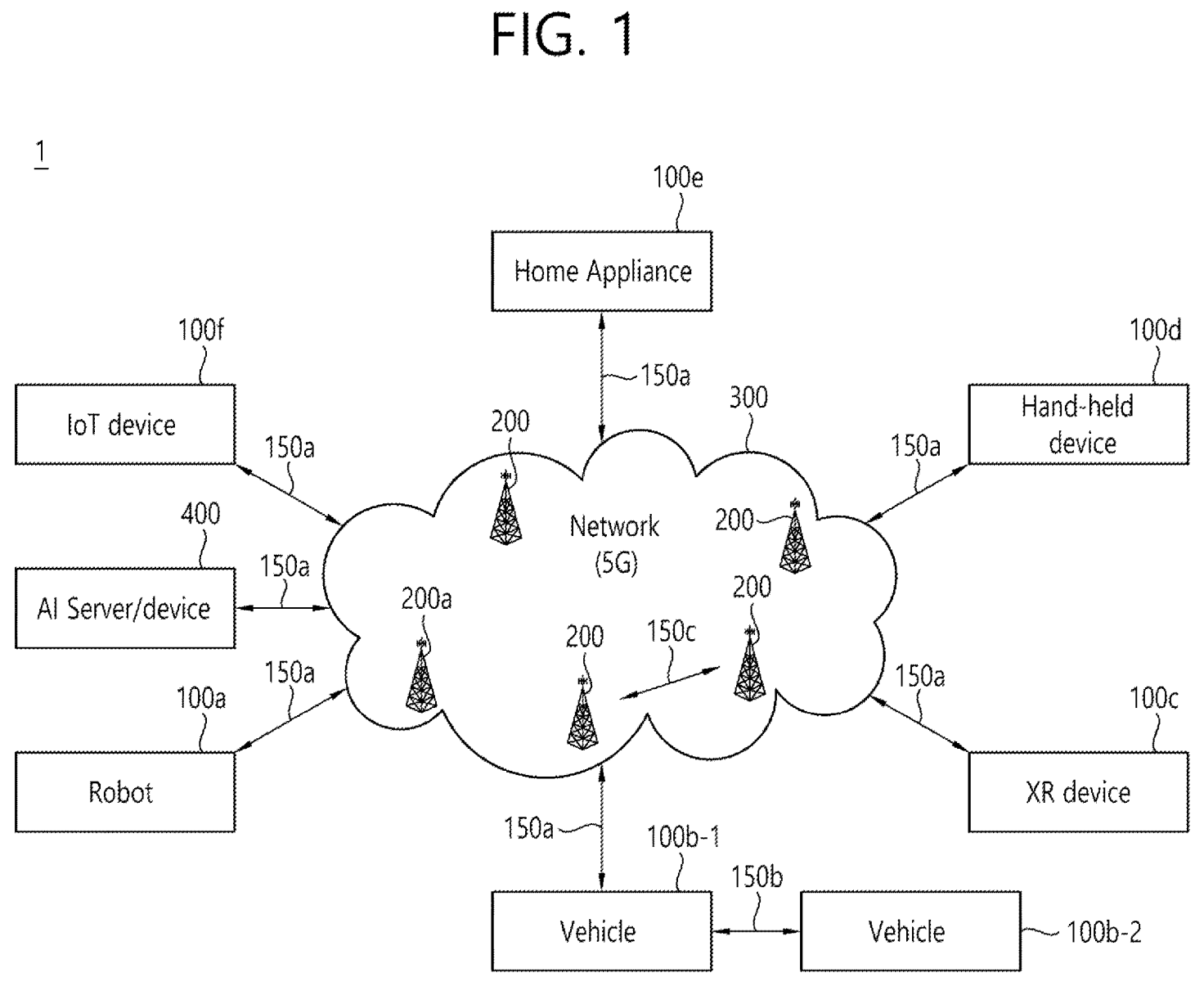

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smart-pad, a wearable device (e.g., a smartwatch or a smart-glasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/ environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/ demodulation, and resource mapping/de-mapping), and resource allocating processes, for transmitting/receiving radio signals, may be performed based on the various proposals of the present disclosure.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory (s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory (s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
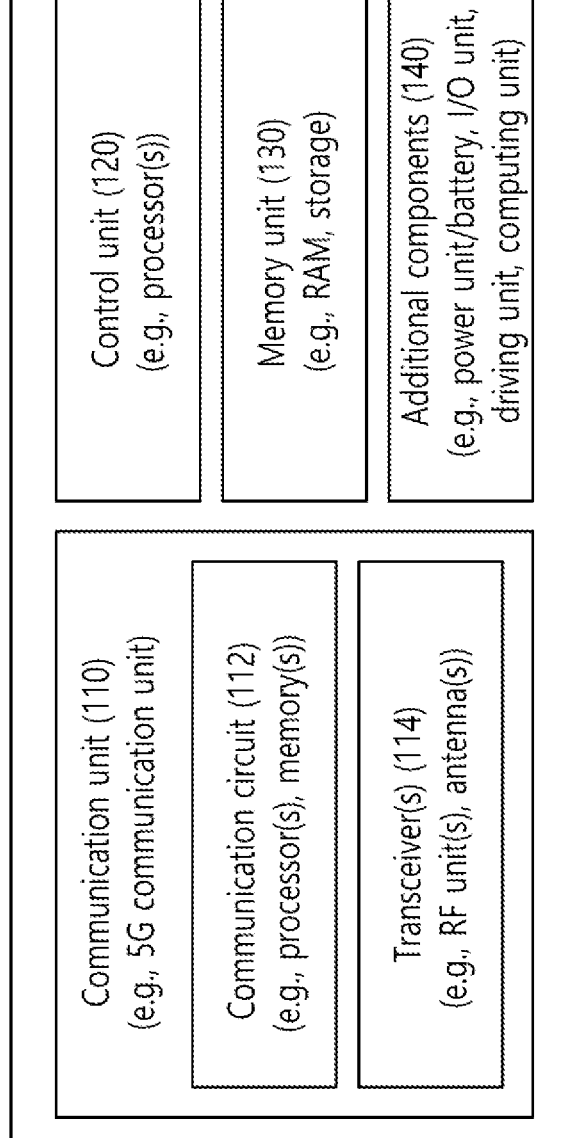
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
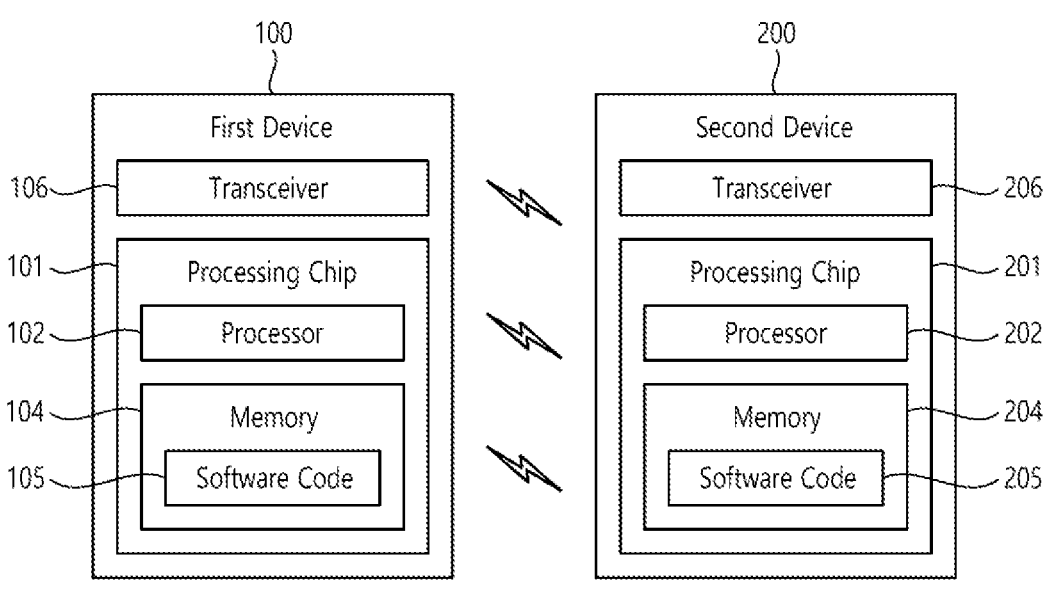
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
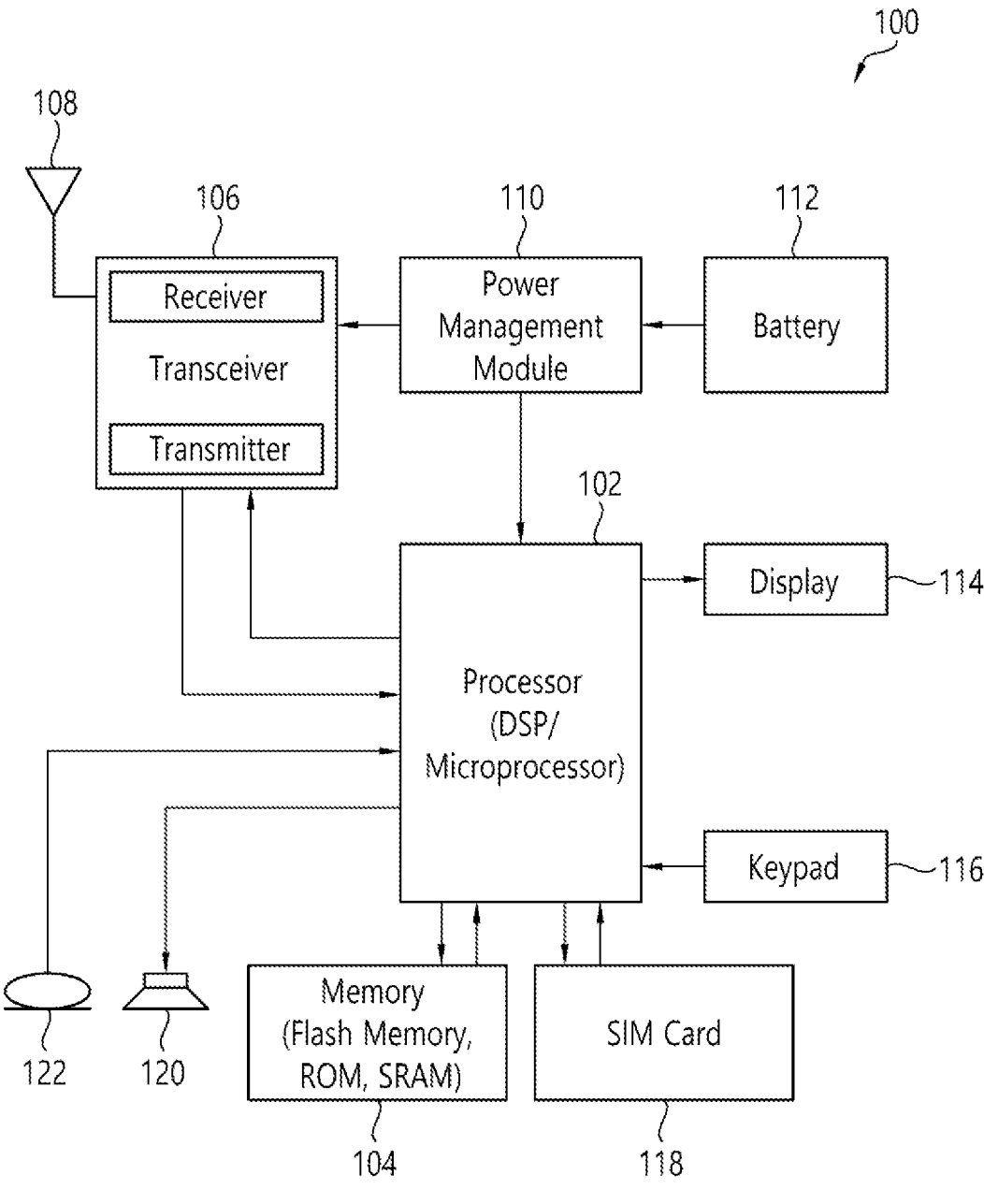
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
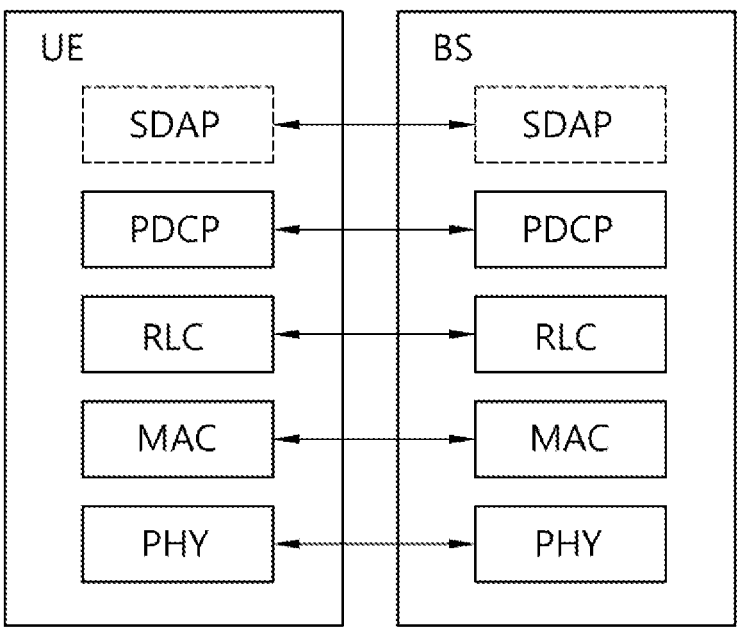
FIGS. 6 and 7 show an example of protocol stacks in a 3GPP based wireless communication system to which implementations of the present disclosure is applied.
Figure 7:
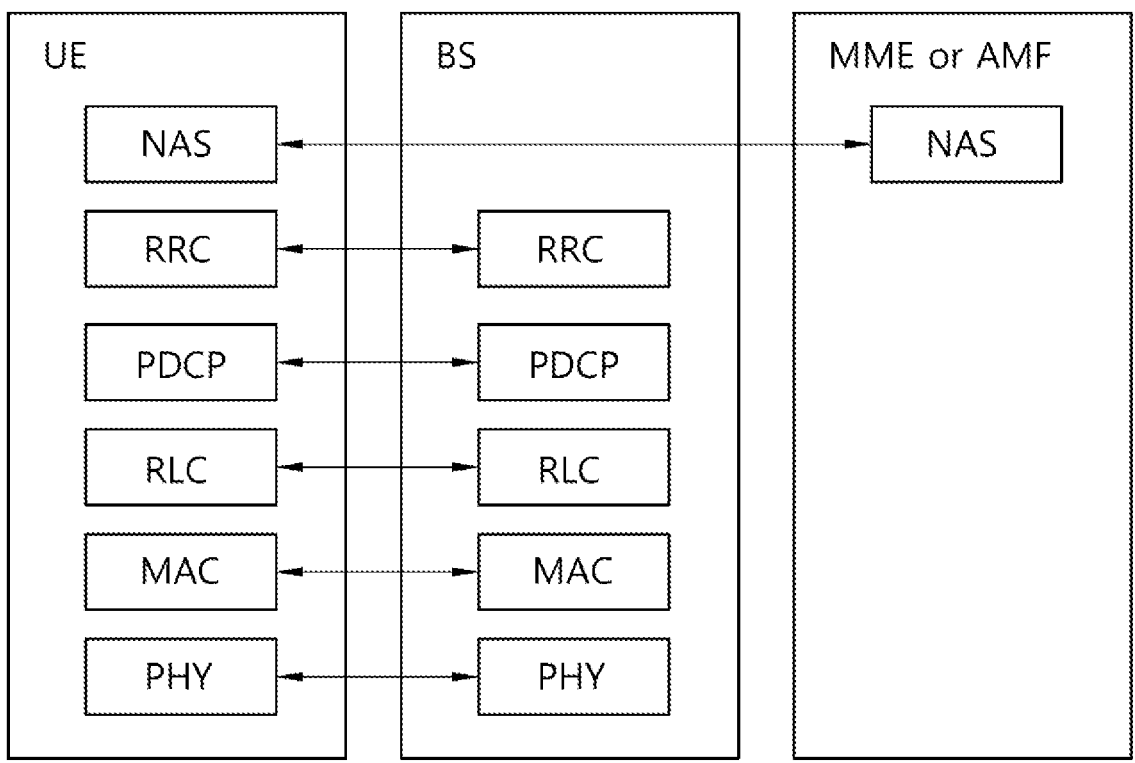

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
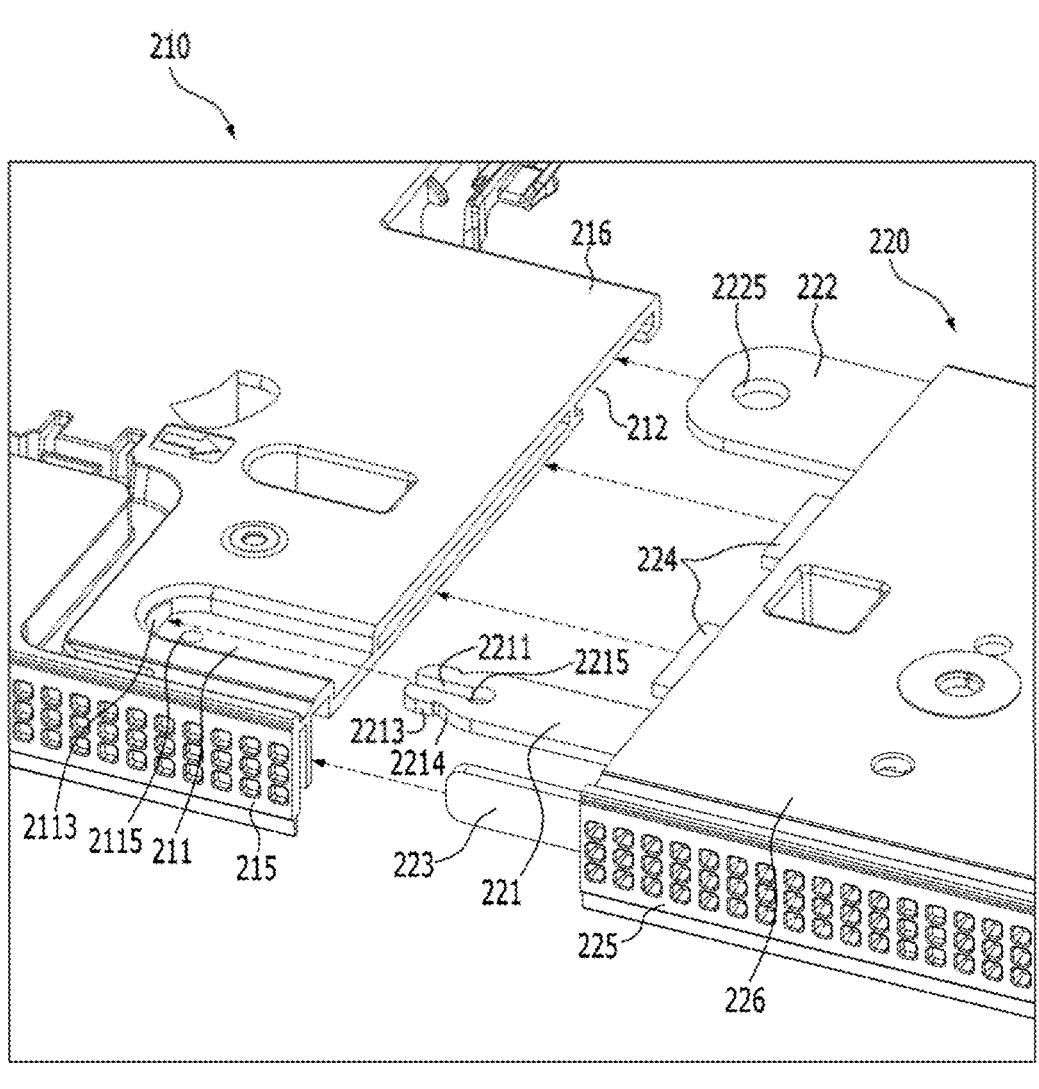
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| $\mu$ | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^u * 15$ kHz.

TABLE 2

| $\mu$ | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
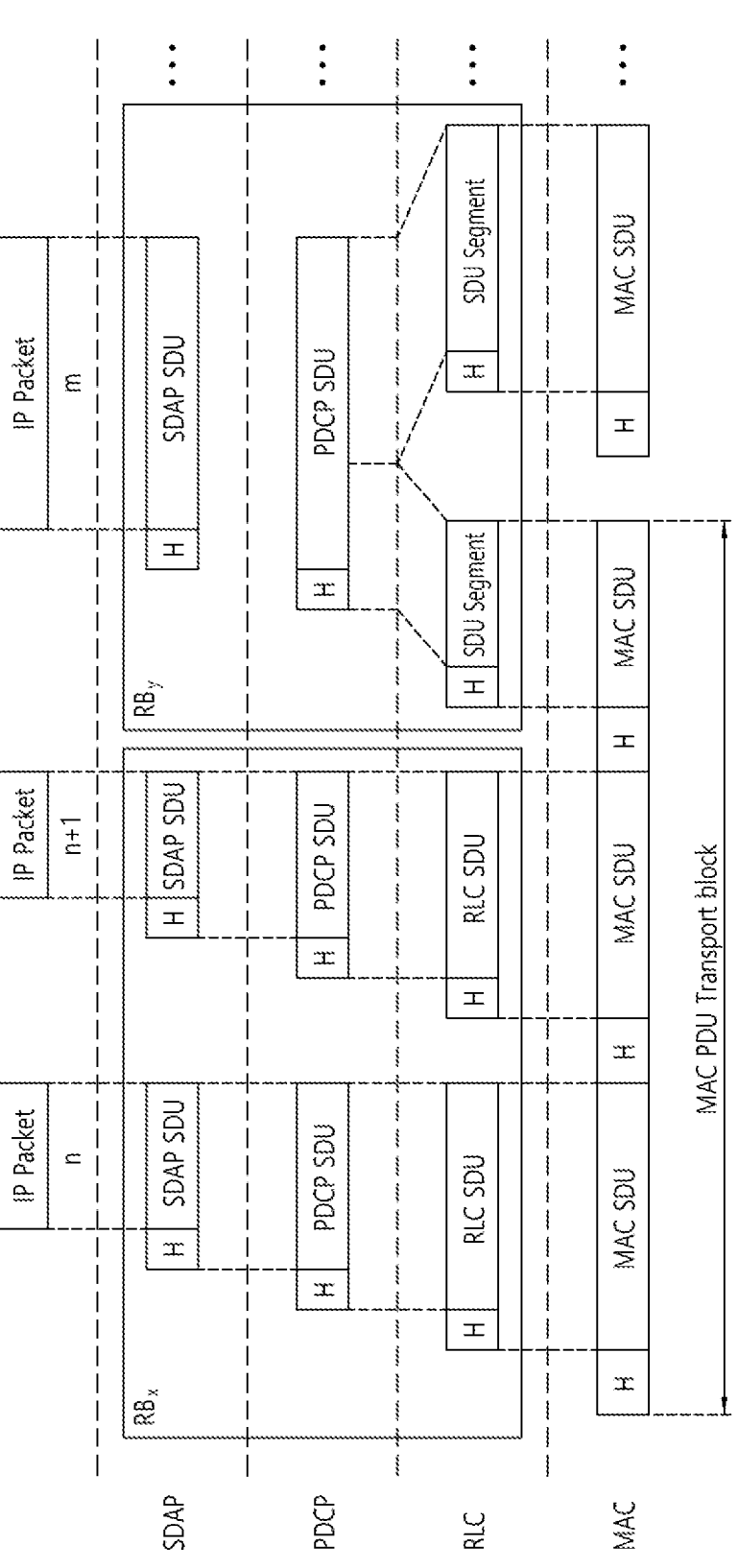
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels physical uplink shared channel (PUSCH) and physical random access channel (PRACH), respectively, and the downlink transport channels DL-SCH, BCH and PCH are mapped to physical downlink shared channel (PDSCH), physical broadcast channel (PBCH) and PDSCH, respectively. In the PHY layer, uplink control information (UCI) is mapped to physical uplink control channel (PUCCH), and downlink control information (DCI) is mapped to physical downlink control channel (PDCCH). A MAC PDU related to UL-SCH is transmitted by a UE via a PUSCH based on an UL grant, and a MAC PDU related to DL-SCH is transmitted by a BS via a PDSCH based on a DL assignment.

Figure 10:
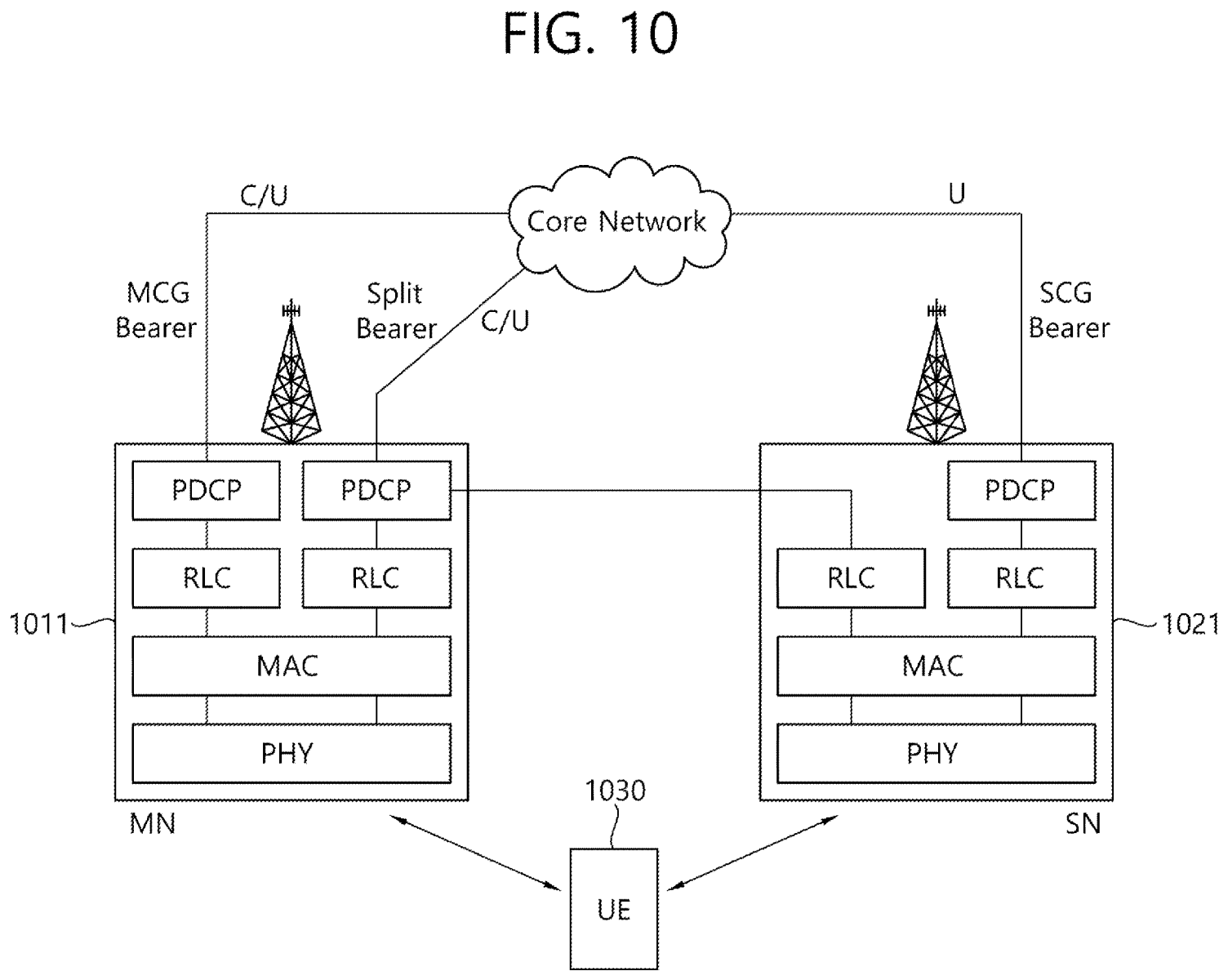

FIG. 10 shows an example of a dual connectivity (DC) architecture to which technical features of the present disclosure can be applied.

Referring to FIG. 10, MN 1011, SN 1021, and a UE 1030 communicating with both the MN 1011 and the SN 1021 are illustrated. As illustrated in FIG. 10, DC refers to a scheme in which a UE (e.g., UE 1030) utilizes radio resources provided by at least two RAN nodes comprising a MN (e.g., MN 1011) and one or more SNs (e.g., SN 1021). In other words, DC refers to a scheme in which a UE is connected to both the MN and the one or more SNs, and communicates with both the MN and the one or more SNs. Since the MN and the SN may be in different sites, a backhaul between the MN and the SN may be construed as non-ideal backhaul (e.g., relatively large delay between nodes).

MN (e.g., MN 1011) refers to a main RAN node providing services to a UE in DC situation. SN (e.g., SN 1021) refers to an additional RAN node providing services to the UE with the MN in the DC situation. If one RAN node provides services to a UE, the RAN node may be a MN. SN can exist if MN exists.

For example, the MN may be associated with macro cell whose coverage is relatively larger than that of a small cell. However, the MN does not have to be associated with macro cell—that is, the MN may be associated with a small cell. Throughout the disclosure, a RAN node that is associated with a macro cell may be referred to as 'macro cell node'. MN may comprise macro cell node.

For example, the SN may be associated with small cell (e.g., micro cell, pico cell, femto cell) whose coverage is relatively smaller than that of a macro cell. However, the SN does not have to be associated with small cell—that is, the SN may be associated with a macro cell. Throughout the disclosure, a RAN node that is associated with a small cell may be referred to as 'small cell node'. SN may comprise small cell node.

The MN may be associated with a master cell group (MCG). MCG may refer to a group of serving cells associated with the MN, and may comprise a primary cell (PCell) and optionally one or more secondary cells (SCells). User plane data and/or control plane data may be transported from a core network to the MN through a MCG bearer. MCG bearer refers to a bearer whose radio protocols are located in the MN to use MN resources. As shown in FIG. 10, the radio protocols of the MCG bearer may comprise PDCP, RLC, MAC and/or PHY.

The SN may be associated with a secondary cell group (SCG). SCG may refer to a group of serving cells associated with the SN, and may comprise a primary secondary cell (PSCell) and optionally one or more SCells. User plane data may be transported from a core network to the SN through a SCG bearer. SCG bearer refers to a bearer whose radio protocols are located in the SN to use SN resources. As shown in FIG. 10, the radio protocols of the SCG bearer may comprise PDCP, RLC, MAC and PHY.

User plane data and/or control plane data may be transported from a core network to the MN and split up/duplicated in the MN, and at least part of the split/duplicated data may be forwarded to the SN through a split bearer. Split bearer refers to a bearer whose radio protocols are located in both the MN and the SN to use both MN resources and SN resources. As shown in FIG. 10, the radio protocols of the split bearer located in the MN may comprise PDCP, RLC, MAC and PHY. The radio protocols of the split bearer located in the SN may comprise RLC, MAC and PHY.

According to various embodiments, PDCP anchor/PDCP anchor point/PDCP anchor node refers to a RAN node comprising a PDCP entity which splits up and/or duplicates data and forwards at least part of the split/duplicated data over X2/Xn interface to another RAN node. In the example of FIG. 10, PDCP anchor node may be MN.

According to various embodiments, the MN for the UE may be changed. This may be referred to as handover, or a MN handover.

According to various embodiments, a SN may newly start providing radio resources to the UE, establishing a connection with the UE, and/or communicating with the UE (i.e., SN for the UE may be newly added). This may be referred to as a SN addition.

According to various embodiments, a SN for the UE may be changed while the MN for the UE is maintained. This may be referred to as a SN change.

According to various embodiments, DC may comprise E-UTRAN NR-DC (EN-DC), and/or multi-radio access technology (RAT)-DC (MR-DC). EN-DC refers to a DC situation in which a UE utilizes radio resources provided by E-UTRAN node and NR RAN node. MR-DC refers to a DC situation in which a UE utilizes radio resources provided by RAN nodes with different RATs.

Hereinafter, mobility is described.

In the disclosure, 'Mobility' refers to a procedure for i) changing a PCell of a UE (i.e., handover or PCell change), ii) changing a PSCell of a UE (i.e., SN change or PSCell change), and/or iii) adding a PSCell for a UE (i.e., SN addition or PSCell addition). Therefore, the mobility may comprise at least one of a handover, an SN change or an SN addition. In other words, the mobility may comprise at least one of PCell change, PSCell change or PSCell addition. Throughout the disclosure, performing a mobility to a target cell may refer to applying a mobility command of the target cell or applying a target cell configuration for the target cell in the mobility command of the target cell. The target cell configuration for the target cell may comprise RRC reconfiguration parameters associated with the mobility to the target cell. Further, RRC reconfiguration and RRC connection reconfiguration may be used interchangeably.

In the disclosure, the target cell configuration may also be referred to as candidate cell configuration. The candidate cell configuration may comprise reconfigurationWithSync, which comprise parameters for the synchronous reconfiguration to the target SpCell. For example, the reconfigurationWithSync may comprise at least one of a new UE-identity (i.e., a kind of RNTI value), timer T304, spCellConfigCommon, rach-ConfigDedicated or smtc. The spCellConfigCommon may comprise ServingCellConfigCommon which is used to configure cell specific parameters of a UE's serving cell. The rach-ConfigDedicated may indicate a random access configuration to be used for a reconfiguration with sync (e.g., mobility). The srntc may indicate a synchronization signal/physical broadcast channel (SS/PBCH) block periodicity/offset/duration configuration of target cell for PSCell change, PCell change and/or PSCell addition. The SS/PBCH block may be simply referred to as synchronization signal block (SSB).

'SN mobility' refers to a procedure for i) changing a PSCell of a UE (i.e., SN change or PSCell change), and/or ii) adding a PSCell for a UE (i.e., SN addition or PSCell addition). Therefore, the SN mobility may comprise at least one of an SN change or an SN addition. In other words, the SN mobility may comprise at least one of PSCell change or PSCell addition. Throughout the disclosure, performing an SN mobility to a target cell may refer to applying an SN mobility command of the target cell or applying a target cell configuration for the target cell in the SN mobility command of the target cell. The target cell configuration for the target cell may comprise RRC reconfiguration parameters associated with the SN mobility to the target cell. The SN mobility may be a kind of a mobility. The SN mobility command may comprise a SN change command for performing SN change, or SN addition command for performing SN addition.

'Mobility condition for a target cell' refers to a triggering condition for a mobility to the target cell. That is, the mobility condition for a target cell refers to a condition that should be satisfied for triggering a mobility to the target cell. Mobility condition may comprise at least one of event A3 condition (i.e., mobility condition for event A3) or event A5 condition (i.e., mobility condition for event A5). The event A3 condition may comprise at least one of an offset value, or a time-to-trigger (TTT). The event A5 condition may comprise at least one of a serving cell threshold, a target cell threshold, or a TTT. The mobility condition for an event may be satisfied if/when an entering condition (or, also referred to as entry condition) for the event is satisfied for at least the TTT. For example, the entering condition for event A3 may be satisfied if a signal quality for a target cell is better than that for a serving cell more than or equal to the offset value. For another example, an entering condition for event A5 may be satisfied if a signal quality for a target cell is better than the target cell threshold and a signal quality for a serving cell is lower than the serving cell threshold. The mobility condition may also be referred to as an execution condition/conditional execution condition/conditional mobility execution condition (e.g., CHO execution condition).

'SN mobility condition for a target cell' refers to a triggering condition for an SN mobility (i.e., SN addition or SN change) to the target cell. That is, the SN mobility condition for a target cell refers to a condition that should be satisfied for triggering an SN mobility to the target cell. SN mobility condition for a target cell may be classified as:

i) SN addition condition for a target cell, which refers to a triggering condition for an SN addition of the target cell; or ii) SN change condition for a target cell, which refers to a triggering condition for an SN change to the target cell.

SN mobility condition may comprise at least one of an event, time-to-trigger (TTT), offset value, or threshold value(s). The SN mobility condition for an event may be satisfied if an entering condition for the event is satisfied for at least the TTT.

For example, SN addition condition may be related to event A4 or event B1. The entering condition for event A4 or B1 may be satisfied if a signal quality for a target cell is better than a threshold.

For example, SN change condition may be related to event A3 or event A5. The entering condition for event A3 may be satisfied if a signal quality for a target cell is better than that for a source PScell more than or equal to the offset value. For another example, the entering condition for event A5 may be satisfied if a signal quality for a target cell is better than a first threshold and a signal quality for a source PScell is lower than a second threshold.

'Conditional mobility' refers to a mobility that is performed to a target cell which satisfies a triggering condition among a plurality of candidate target cells. Throughout the disclosure, performing a conditional mobility to a target cell may refer to applying a conditional mobility command of a target cell which satisfies a mobility condition for the target cell among a plurality of candidate target cells or applying a target cell configuration for the target cell in the conditional mobility command of the target cell which satisfies a mobility condition for the target cell among the plurality of candidate target cells. The target cell configuration for the target cell may comprise RRC reconfiguration parameters associated with the conditional mobility to the target cell. Conditional mobility may comprise a conditional handover (i.e., conditional PCell change), a conditional SN change (i.e., conditional PSCell change (CPC)), and/or conditional SN addition (i.e., conditional PSCell addition (CPA)). The conditional PSCell addition/change (CPAC) may comprise the CPC and/or the CPA.

Figure 11:
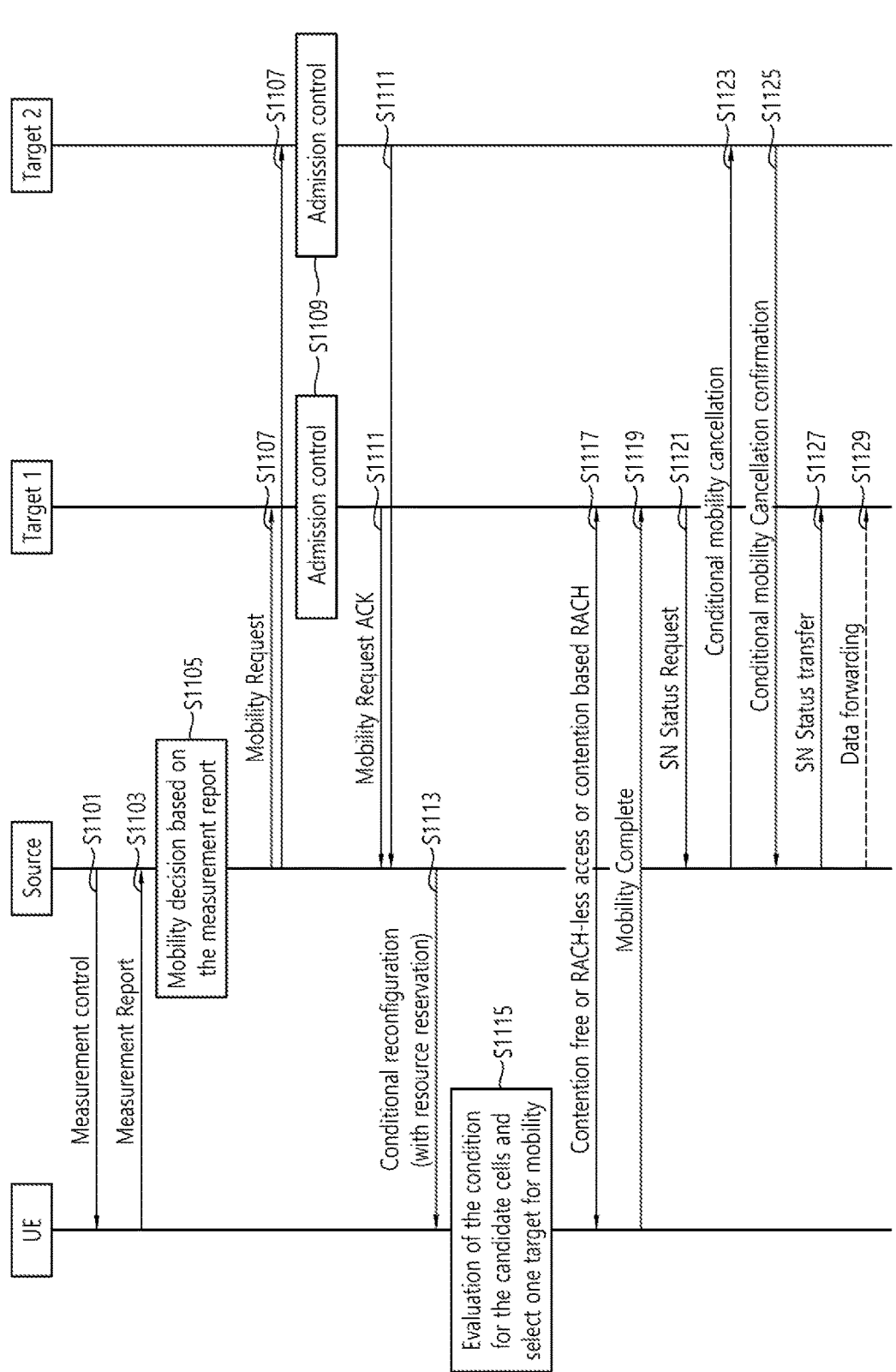
FIG. 11 shows an example of a conditional mobility procedure to which technical features of the present disclosure can be applied.

FIG. 11 shows an example of a conditional mobility procedure to which technical features of the present disclosure can be applied. The steps illustrated in FIG. 11 can also be applied to a conditional handover procedure, conditional SN addition procedure and/or conditional SN change procedure.

Referring to FIG. 11, in step S1101, the source cell may transmit measurement control message to the UE. The source cell may configure the UE measurement procedures according to the roaming and access restriction information and, for example, the available multiple frequency band information through the measurement control message. Measurement control information provided by the source cell through the measurement control message may assist the function controlling the UE's connection mobility. For example, the measurement control message may comprise measurement configuration and/or report configuration.

In step S1103, the UE may transmit a measurement report message to the source cell. The measurement report message may comprise a result of measurement on neighbor cell(s) around the UE which can be detected by the UE. The UE may generate the measurement report message according to a measurement configuration and/or measurement control information in the measurement control message received in step S1101.

In step S1105, the source cell may make a mobility decision based on the measurement report. For example, the source cell may make a mobility decision and determine candidate target cells (e.g., target cell 1 and target cell 2) for mobility among neighbor cells around the UE based on a result of measurement (e.g., signal quality, reference signal received power (RSRP), reference signal received quality (RSRQ)) on the neighbor cells.

In step S1107, the source cell may transmit mobility request messages to the target cell 1 and the target cell 2 which are determined in step S1105. That is, the source cell may perform mobility preparation with the target cell 1 and the target cell 2. The mobility request message may comprise necessary information to prepare the mobility at the target side (e.g., target cell 1 and target cell 2).

In step S1109, each of the target cell 1 and the target cell 2 may perform an admission control based on information included in the mobility request message. The target cell may configure and reserve the required resources (e.g., C-RNTI and/or RACH preamble). The AS-configuration to be used in the target cell can either be specified independently (i.e. an "establishment") or as a delta compared to the AS-configuration used in the source cell (i.e. a "reconfiguration").

In step S1111, the target cell and the target cell 2 may transmit a mobility request acknowledge (ACK) message to the source cell. The mobility request ACK message may comprise information on resources reserved and prepared for a mobility. For example, the mobility request ACK message may comprise a transparent container to be sent to the UE as an RRC message to perform the mobility. The container may include a new C-RNTI, target gNB security algorithm identifiers for the selected security algorithms, a dedicated RACH preamble, and/or possibly some other parameters i.e. access parameters, SIBs. If RACH-less mobility is configured, the container may include timing adjustment indication and optionally a preallocated uplink grant. The mobility request ACK message may also include RNL/TNL information for forwarding tunnels, if necessary. As soon as the source cell receives the mobility request ACK message, or as soon as the transmission of the conditional mobility command is initiated in the downlink, data forwarding may be initiated.

In step S1113, the source cell may transmit a conditional reconfiguration to the UE. The conditional reconfiguration may be also referred to as (or, may comprise) conditional handover (CHO) configuration and/or a conditional mobility command (e.g., CHO command). The conditional reconfiguration may comprise a conditional reconfiguration for each of the candidate target cells (e.g., target cell 1, target cell 2). For example, the conditional reconfiguration may comprise a conditional reconfiguration for the target cell 1, and a conditional reconfiguration for the target cell 2. The conditional reconfiguration for the target cell 1 may comprise a mobility condition for the target cell 1, and a target cell configuration for the target cell 1. The target cell configuration for the target cell 1 may comprise RRC reconfiguration parameters associated with a mobility to the target cell 1, including information on resources reserved for the mobility to the target cell 1. Similarly, the conditional reconfiguration for the target cell 2 may comprise a mobility condition for the target cell 2, and a target cell configuration for the target cell 2. The target cell configuration for the target cell 2 may comprise RRC reconfiguration parameters associated with a mobility to the target cell 2, including information on resources reserved for the mobility to the target cell 2.

The mobility condition may inform at least one measurement ID. For example, the mobility condition may inform at most 2 measurement IDs. If a mobility condition of a target cell informs a measurement ID which is related to a measurement object A and a report configuration B, evaluating the mobility condition may comprise determining whether a measurement result on the measurement object A satisfies a report condition in the report configuration B. If the measurement result on the measurement object A satisfies the report condition in the report configuration B according to the evaluation of the mobility condition, the UE may determine that the mobility condition of the target cell is satisfied (or, the target cell/measurement result for the target cell satisfies the mobility condition of the target cell), and perform a mobility to the target cell.

In step S1115, the UE may perform an evaluation of the mobility condition for the candidate target cells (e.g., target cell 1, target cell 2) and select a target cell for a mobility among the candidate target cells. For example, the UE may perform measurements on the candidate target cells, and determine whether a candidate target cell satisfies a mobility condition for the candidate target cell among the candidate target cells based on a result of the measurements on the candidate target cells. If the UE identifies that the target cell 1 satisfies a mobility condition for the target cell 1, the UE may select the target cell 1 as a target cell for the mobility.

In step S1117, the UE may perform a random access to the selected target cell (e.g., target cell 1). For example, the UE may transmit a random access preamble to the target cell 1, and receive a random access response comprising an uplink grant from the target cell 1. If RACH-less mobility is configured, the step S1117 may be omitted, and the uplink grant may be provided in step S1113.

In step S1119, the UE may transmit a mobility complete message to the target cell 1. When the UE has successfully accessed the target cell 1 (or, received uplink grant when RACH-less mobility is configured), the UE may transmit a mobility complete message comprising a C-RNTI to confirm the mobility, along with uplink buffer status report, whenever possible, to the target cell 1 to indicate that the mobility procedure is completed for the UE. The target cell 1 may verify the C-RNTI transmitted in the mobility complete message.

In step S1121, the target cell 1 may transmit a sequence number (SN) status request message to the source cell. The target cell 1 may request the source cell to inform the target cell 1 of a SN of a packet the target cell 1 has to transmit after the mobility, via the SN status request message.

In step S1123, the source cell may transmit a conditional mobility cancellation message to the target cell 2 which is not selected as a target cell for a mobility among the candidate target cells. After receiving the conditional mobility cancellation message, the target cell 2 may release resources that are reserved in case of a mobility.

In step S1125, the target cell 2 may transmit a conditional mobility cancellation confirmation message to the source cell, as a response for the conditional mobility cancellation message. The conditional mobility cancellation confirmation message may inform that the target cell 2 has released resources reserved in case of a mobility.

In step S1127, the source cell may transmit a SN status transfer message to the target cell 1, as a response for the SN status request message. The SN status transfer message may inform the target cell 1 of a SN of a packet the target cell 1 has to transmit after the mobility.

In step S1129, the source cell may perform a data forwarding to the target cell 1. For example, the source cell may forward data received from a core network to the target cell 1 so that the target cell 1 can now transmit the data to the UE.

For conditional mobility, the network configures the UE with one or more candidate target SpCells in the conditional reconfiguration. The UE evaluates the condition of each configured candidate target SpCell. The UE applies the conditional reconfiguration associated with one of the target SpCells which fulfils associated execution condition. The network provides the configuration parameters for the target SpCell in the ConditionalReconfiguration information element (IE).

The UE may receive ConditionalReconfiguration IE including one or more fields described in table 5:

TABLE 5

```
-- ASN1START
-- TAG-CONDITIONALRECONFIGURATION-START
ConditionalReconfiguration-r16 ::=   SEQUENCE {
    attemptCondReconfig-r16      ENUMERATED {true}      OPTIONAL,   -- Cond
CHO
    condReconfigToRemoveList-r16      CondReconfigToRemoveList-r16  OPTIONAL,   --
Need N
    condReconfigToAddModList-r16      CondReconfigToAddModList-r16  OPTIONAL,   -
- Need N
    ...
}
CondReconfigToRemoveList-r16 ::=   SEQUENCE (SIZE (1.. maxNrofCondCells-r16)) OF
CondReconfigId-r16
-- TAG-CONDITIONALRECONFIGURATION-STOP
-- ASN1STOP
```

In table 5, if the attemptCondReconfig is present, the UE shall perform conditional reconfiguration if selected cell is a target candidate cell and it is the first cell selection after failure. The condReconfigToAddModList is a list of the configuration of candidate SpCells to be added or modified for CHO, CPA or CPC. The condReconfigToRemoveList is a list of the configuration of candidate SpCells to be removed.

The condReconfigToAddModList may include one or more fields described in table 6:

TABLE 6

```
-- ASN1START
-- TAG-CONDRECONFIGTOADDMODLIST-START
CondReconfigToAddModList-r16 ::= SEQUENCE (SIZE (1.. maxNrofCondCells-r16)) OF
CondReconfigToAddMod-r16  (i.e., conditional  mobility  command/conditional
reconfiguration)
CondReconfigToAddMod-r16 ::=   SEQUENCE {
    condReconfigId-r16      CondReconfigId-r16,
    condExecutionCond-r16         SEQUENCE  (SIZE  (1..2))  OF  MeasId
OPTIONAL,   -- Need M
    condRRCReconfig-r16      OCTET STRING (CONTAINING RRCReconfiguration)
OPTIONAL,   -- Cond condReconfigAdd
    ...,
    [[
    condExecutionCondSCG-r17         OCTET    STRING   (CONTAINING
CondReconfigExecCondSCG-r17) OPTIONAL    -- Need M
    ]]
}
CondReconfigExecCondSCG-r17 ::= SEQUENCE (SIZE (1..2)) OF MeasId
-- TAG-CONDRECONFIGTOADDMODLIST-STOP
-- ASN1STOP
```

In table 6:

CondReconfigId is an identity of a conditional mobility command/conditional reconfiguration (e.g., CHO, CPA or CPC configuration);

condExecutionCond (i.e., mobility command) is an execution condition that needs to be fulfilled in order to trigger the execution of a conditional reconfiguration for CHO, CPA, intra-SN CPC without MN involvement or MN initiated inter-SN CPC. When configuring 2 triggering events (Meas Ids) for a candidate cell, network ensures that both refer to the same measObject. For CHO, if network configures condEventD1 or condEventT1 for a candidate cell network configures a second triggering event condEventA3, condEventA4 or condEventA5 for the same candidate cell. Network does not configure both condEventD1 and condEventT1 for the same candidate cell;

condExecutionCondSCG (i.e., mobility condition) contains execution condition that needs to be fulfilled in order to trigger the execution of a conditional reconfiguration for SN initiated inter-SN CPC. The Meas Ids refer to the measConfig associated with the SCG. When configuring 2 triggering events (Meas Ids) for a candidate cell, network ensures that both refer to the same measObject. For each condReconfigurationId, the network always configures either condExecutionCond or condExecutionCondSCG (not both); and condRRCReconfig (i.e., target cell configuration) is a RRCReconfiguration message to be applied when the condition(s) are fulfilled. The RRCReconfiguration message contained in condRRCReconfig cannot contain the field conditionalReconfiguration or the field daps-Config. For CPA and for CPC, the RRCReconfiguration message contained in condRRCReconfig cannot contain the field scg-State.

The UE may store the condReconfigToAddModList, and the stored condReconfigToAddModList can be represented as VarConditionalReconfig.

The UE performs the following actions based on a received ConditionalReconfiguration IE:

1> if the ConditionalReconfiguration contains the condReconfigToRemoveList:

2> perform conditional reconfiguration removal procedure;

1> if the ConditionalReconfiguration contains the condReconfigToAddModList:

2> perform conditional reconfiguration addition/modification.

For conditional reconfiguration removal, the UE shall:

1> for each condReconfigId value included in the condReconfigToRemoveList that is part of the current UE conditional reconfiguration in VarConditionalReconfig:

2> remove the entry with the matching condReconfigId from the VarConditionalReconfig.

Regarding conditional reconfiguration addition/modification, for each condReconfigId received in the condReconfigToAddModList IE the UE shall:

1> if an entry with the matching condReconfigId exists in the condReconfigToAddModList within the VarConditionalReconfig:

2> if the entry in condReconfigToAddModList includes an condExecutionCond or condExecutionCondSCG;

3> replace condExecutionCond or condExecutionCondSCG within the VarConditionalReconfig with the value received for this condReconfigId;

2> if the entry in condReconfigToAddModList includes an condRRCReconfig;

3> replace condRRCReconfig within the VarConditionalReconfig with the value received for this condReconfigId;

1> else:

2> add a new entry for this condReconfigId within the VarConditionalReconfig;

1> perform conditional reconfiguration evaluation.

For conditional reconfiguration evaluation, the UE shall:

1> for each condReconfigId within the VarConditionalReconfig:

2> if the RRCReconfiguration within condRRCReconfig includes the masterCellGroup including the reconfigurationWithSync:

3> consider the cell which has a physical cell identity matching the value indicated in the ServingCellConfigCommon included in the reconfigurationWithSync within the masterCellGroup in the received condRRCReconfig to be applicable cell;

2> else if the RRCReconfiguration within condRRCReconfig includes the secondaryCellGroup including the reconfigurationWithSync:

3> consider the cell which has a physical cell identity matching the value indicated in the ServingCellConfigCommon included in the reconfigurationWithSync within the secondaryCellGroup within the received condRRCReconfig to be applicable cell;

2> if condExecutionCondSCG is configured:

3> in the remainder of the procedure, consider each measId indicated in the condExecutionCondSCG as a measId in the VarMeasConfig associated with the SCG measConfig;

2> if condExecutionCond is configured:

3> if it is configured via SRB3 or configured within nr-SCG or within nr-SecondaryCellGroupConfig via SRB1:

4> in the remainder of the procedure, consider each measId indicated in the condExecutionCond as a measId in the VarMeasConfig associated with the SCG measConfig;

3> else:

4> in the remainder of the procedure, consider each measId indicated in the condExecutionCond as a measId in the VarMeasConfig associated with the MCG measConfig;

2> for each measId included in the measIdList within VarMeasConfig indicated in the condExecutionCond or condExecutionCondSCG associated to condReconfigId.

3> if the condEventId is associated with condEventT1, and if the entry condition applicable for this event associated with the condReconfigId, i.e. the event corresponding with the condEventId(s) of the corresponding condTriggerConfig within VarConditionalReconfig, is fulfilled for the applicable cell; or 3> if the condEventId is associated with condEventD1, and if the entry condition(s) applicable for this event associated with the condReconfigId, i.e. the event corresponding with the condEventId(s) of the corresponding condTriggerConfig within VarConditionalReconfig, is fulfilled for the applicable cell during the corresponding timeToTrigger defined for this event within the VarConditionalReconfig; or 3> if the condEventId is associated with condEventA3, condEventA4 or condEventA5, and if the entry condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:

4> consider the event associated to that measId to be fulfilled;

3> if the measId for this event associated with the condReconfigId has been modified; or 3> if the condEventId is associated with condEventT1, and if the leaving condition applicable for this event associated with the condReconfigId, i.e. the event corresponding with the condEventId(s) of the corresponding condTriggerConfig within VarConditionalReconfig, is fulfilled for the applicable cell; or 3> if the condEventId is associated with condEventD1, and if the leaving condition(s) applicable for this event associated with the condReconfigId, i.e. the event corresponding with the condEventId(s) of the corresponding condTriggerConfig within VarConditionalReconfig, is fulfilled for the applicable cells during the corresponding timeToTrigger defined for this event within the VarConditionalReconfig; or 3> if the condEventId is associated with condEventA3, condEventA4 or condEventA5, and if the leaving condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:

4> consider the event associated to that measId to be not fulfilled;

2> if event(s) associated to all measId(s) within condTriggerConfig for a target candidate cell within the stored condRRCReconfig are fulfilled:

3> consider the target candidate cell within the stored condRRCReconfig, associated to that condReconfigId, as a triggered cell;

3> initiate the conditional reconfiguration execution.

According to various embodiments, up to 2 MeasId can be configured for each condReconfigId. The conditional reconfiguration event of the 2 MeasId may have the same or different event conditions, triggering quantity, time to trigger, and triggering threshold.

Regarding conditional reconfiguration evaluation of SN initiated inter-SN CPC for EN-DC, the UE shall:

1> for each condReconfigurationId within the VarConditionalReconfiguration:

2> for each measId included in the measIdList within VarMeasConfig indicated in the CondReconfigExecCondSCG contained in the triggerConditionSN associated to the condReconfigurationId:

3> if the entry condition(s) applicable for the event associated with that measId, is fulfilled for the applicable cells for all measurements after layer 3 filtering taken during the corresponding timeToTrigger defined for this event associated with that measId:

4> consider this event to be fulfilled;

3> if the measId for this event has been modified; or

3> if the leaving condition(s) applicable for this event associated with that measId, is fulfilled for the applicable cells for all measurements after layer 3 filtering taken during the corresponding timeToTrigger defined for this event associated with that measId:

4> consider this event associated to that measId to be not fulfilled;

2> if trigger conditions for all events associated with the measId(s) indicated in the CondReconfigExecCondSCG contained in the triggerConditionSN, are fulfilled:

3> consider the target cell candidate within the RRCReconfiguration message contained in nr-SecondaryCellGroupConfig in the RRCConnectionReconfiguration message, contained in the stored condReconfigurationToApply, associated to that condReconfigurationId, as a triggered cell;

3> initiate the conditional reconfiguration execution.

For conditional reconfiguration execution, the UE shall:

1> if more than one triggered cell exists:

2> select one of the triggered cells as the selected cell for conditional reconfiguration execution;

1> else:

2> consider the triggered cell as the selected cell for conditional reconfiguration execution;

1> for the selected cell of conditional reconfiguration execution:

2> apply the stored condRRCReconfig of the selected cell.

According to various embodiments, if multiple NR cells are triggered in conditional reconfiguration execution, the UE may select one of the triggered cells for execution based on UE implementation. For example, the UE may select one of the triggered cells for execution based on beams and/or beam quality.

Meanwhile, UE may perform an optimized mobility which includes a PSCell addition and/or PSCell change without reconfiguration and/or re-initialization on CPA/CPC preparation from a network. During the optimized mobility procedure, the UE may use conditional mobility commands received before performing a mobility, for a next mobility after performing the mobility. That is, the UE may maintain the given/received conditional mobility commands regardless of a change of the serving cells and use the conditional mobility commands whenever associated condition is met.

In order for the UE to perform the optimized mobility, there must be information for the UE informing in which cell the UE is allowed to perform the optimized mobility i.e., in which cell the UE is allowed to access without reconfiguration and re-initialization. This optimized mobility can reduce a latency of mobility procedure and reduce a data transmission/reception time by skipping a procedure of reception of reconfiguration and synchronization in mobility.

However, all neighbour cells may not be physically and geographically capable of the optimized mobility. That is, some old neighbour cells may require the legacy mobility procedure with reconfiguration and re-initialization.

Therefore, when performing mobility to a neighbour cell, the UE needs to know whether to perform the optimized mobility without reconfiguration and re-initialization for the neighbour cell. Also the UE needs to know whether to remain the rest of the mobility command information for other neighbour cells and whether the rest of the mobility command information for other neighbour cells can be maintained after successful mobility to the neighbour cell.

In the present disclosure, the UE may be provided with one or more indications from the network to distinguish whether the mobility command(s) provided by the previous serving cell(s) is (are) the mobility command(s) that the UE can use to perform mobility on/from the current serving cell without reconfiguration and re-initialization for the mobility.

The indication can be provided to the UE via RRC dedicated signalling (e.g., RRC Reconfiguration message) or broadcast signalling (e.g., system information acquisition). If the network provides the indication via RRC dedicated signalling, the last serving cell (e.g., the serving cell that the UE was camping on immediately before) may include the indication in the mobility command for the current serving cell i.e., the last applied reconfiguration message may include the indication for the next mobility. That is, if the UE performs mobility to a new target cell, the indication may be included in the corresponding mobility command for the new target cell to indicate which neighbour cells support the optimized mobility on/from the new target cell after the mobility to the new target cell. Otherwise, if the network provides the indication via broadcast signalling, the UE may perform acquisition of broadcast information (or, system information) to receive the indication while or after the mobility to the new target cell.

For example, the indication informs whether the remaining mobility commands of the UE can be used to perform the optimized mobility in the new serving cell. Through the indication, the UE may figure out, for the next mobility, which mobility commands can be used to perform the optimized mobility and which mobility commands should be used to perform the legacy mobility. The indication may additionally indicate which mobility command(s) doesn't need to be kept after mobility, then the UE may remove the corresponding mobility command(s) based on the indication after mobility is complete.

The indication may comprise at least one of:

Flag: if the indication is provided by a flag, i.e., true or false information, each mobility command for the optimized mobility should include the flag information. If the flag information is set to true, the UE may regard the corresponding mobility command as being allowed to perform optimized mobility;

Frequency list (e.g., measurement object ID list): if the indication is provided by the frequency list, the UE may regard all mobility commands corresponding to the frequency list as being allowed to perform optimized mobility. For the frequency list, the network may provide the measurement object list and/or the measurement object ID list to the UE.

Cell list (e.g., conditional reconfiguration ID list): if the indication is provided by the cell list, the UE may regard all mobility commands corresponding to the cell list as being allowed to perform optimized mobility. For the cell list, the network may provide the cell ID list and/or the conditional reconfiguration ID list to the UE.

For the optimized mobility, the UE may manage a list. The list may comprise a list of cells or mobility commands that can be used to perform the optimal mobility in the new serving cell. The UE may update this list to keep performing the optimized mobility whenever the mobility is completed. For the list update, the UE may use the provided indication to check which cells are still capable of the optimized mobility in the new serving cell after the mobility. The cells that are no longer allowed to perform the optimized mobility or the cells for which mobility commands need to be removed should be removed from this list for the next mobility.

After the list update for the optimized mobility, the UE may determine whether the optimized mobility can be performed based on the list when there is a target cell that satisfies the mobility execution condition that may have been previously provided by the network. If the target cell belongs to the list for the optimized mobility, the UE may perform the mobility using the corresponding mobility command without wait time for additional reconfiguration from the network, and in the mobility procedure, i.e., changing from a source serving cell to a target serving cell, the UE may skip the synchronization procedure including random access channel (RACH) procedure.

Figure 12:
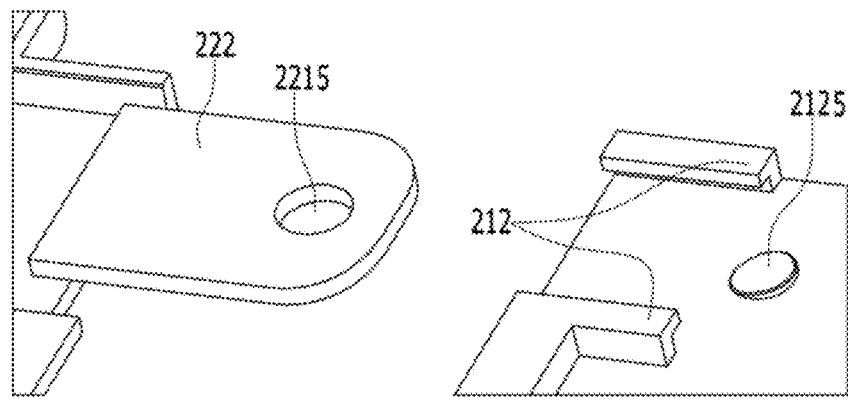
FIG. 12 shows an example of a method performed by a UE according to an embodiment of the present disclosure.
Figure 12:
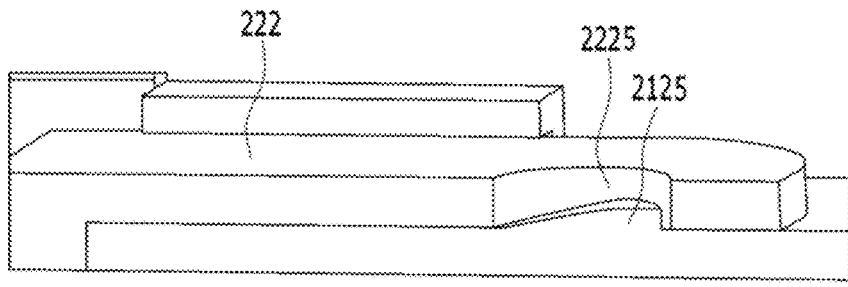

FIG. 12 shows an example of a method performed by a UE according to an embodiment of the present disclosure. The method may also be performed by a wireless device.

Referring to FIG. 12, in step S1201, the UE may receive, from a network, i) a plurality of mobility commands for a mobility and ii) validity information informing whether each mobility command is valid for a next mobility after the mobility is completed. That is, the validity information may inform whether each mobility command is valid for an optimized mobility. Each of the plurality of mobility commands may be related to a corresponding target cell.

In step S1203, the UE may perform a mobility to a first target cell, based on a mobility command related to the first target cell among the plurality of mobility commands.

After the mobility to the first target cell is completed, in step S1205, the UE may release one or more invalid mobility commands while maintaining one or more valid mobility commands, based on the validity information. Further, in step S1207, the UE may perform a mobility to a second target cell, based on a mobility command related to the second target cell among the one or more valid mobility commands.

According to various embodiments, the validity information may be related to each of the plurality of mobility commands.

According to various embodiments, the validity information may inform whether the related mobility command is valid for a next mobility to a corresponding target cell after a mobility to another target cell is completed According to various embodiments, the validity information may comprise a flag.

According to various embodiments, the validity information may inform whether each of one or more remaining mobility commands other than the related mobility command among the plurality of mobility commands is valid for a next mobility after a mobility based on the related mobility command is completed.

According to various embodiments, first validity information for the mobility command related to the first target cell may inform whether each mobility command related to a neighbor cell of the first target cell is valid for a next mobility after the mobility to the first target cell is completed. Second validity information for the mobility command related to the second target cell may inform whether each mobility command related to a neighbor cell of the second target cell is valid for a next mobility after the mobility to the second target cell is completed.

According to various embodiments, the first validity information may inform one or more first valid mobility commands related to one or more neighbor cells of the first target cell. The second validity information may inform one or more second valid mobility commands related to one or more neighbor cells of the second target cell.

According to various embodiments, at least part of the one or more first valid mobility commands may be different from the one or more second valid mobility commands.

According to various embodiments, the validity information may be included in each of the plurality of mobility commands.

According to various embodiments, the validity information may comprise a frequency list or a cell list including at least one target cell to which related mobility command is valid for a next mobility after a mobility to another target cell is completed.

According to various embodiments, the frequency list may comprise a list of measurement object identities (IDs). Each measurement object ID may identify each of frequencies including the at least one target cell in the frequency list.

According to various embodiments, the cell list may comprise a list of mobility command identities (IDs). Each mobility command ID may identify each of the at least one target cell in the cell list.

According to various embodiments, the UE may receive a cell list for one or more multiple mobility commands which allows being kept after mobility success for a cell group. The cell list may indicate that each cell in the cell list doesn't require synchronization or re-initialization steps during mobility (i.e., optimized mobility is possible to each cell in the cell list). The UE may perform a mobility to a first target cell in the cell list. The UE may check whether there is information (e.g., validity information) in the mobility command for the first target cell to discriminate which remaining mobility commands are still allowed to be kept after mobility access towards the first target cell. The UE may release one or more cells from the cell list if the information indicates that the one or more cells are not allowed to be kept after mobility success for a cell group on the first target cell. The UE may perform a mobility to a second target cell. The second target cell may require synchronization or re-initialization procedures during mobility if the second target cell is not in the cell list. The second target cell may not require synchronization or re-initialization procedures during mobility if the second target cell is still in the cell list.

Figure 13:
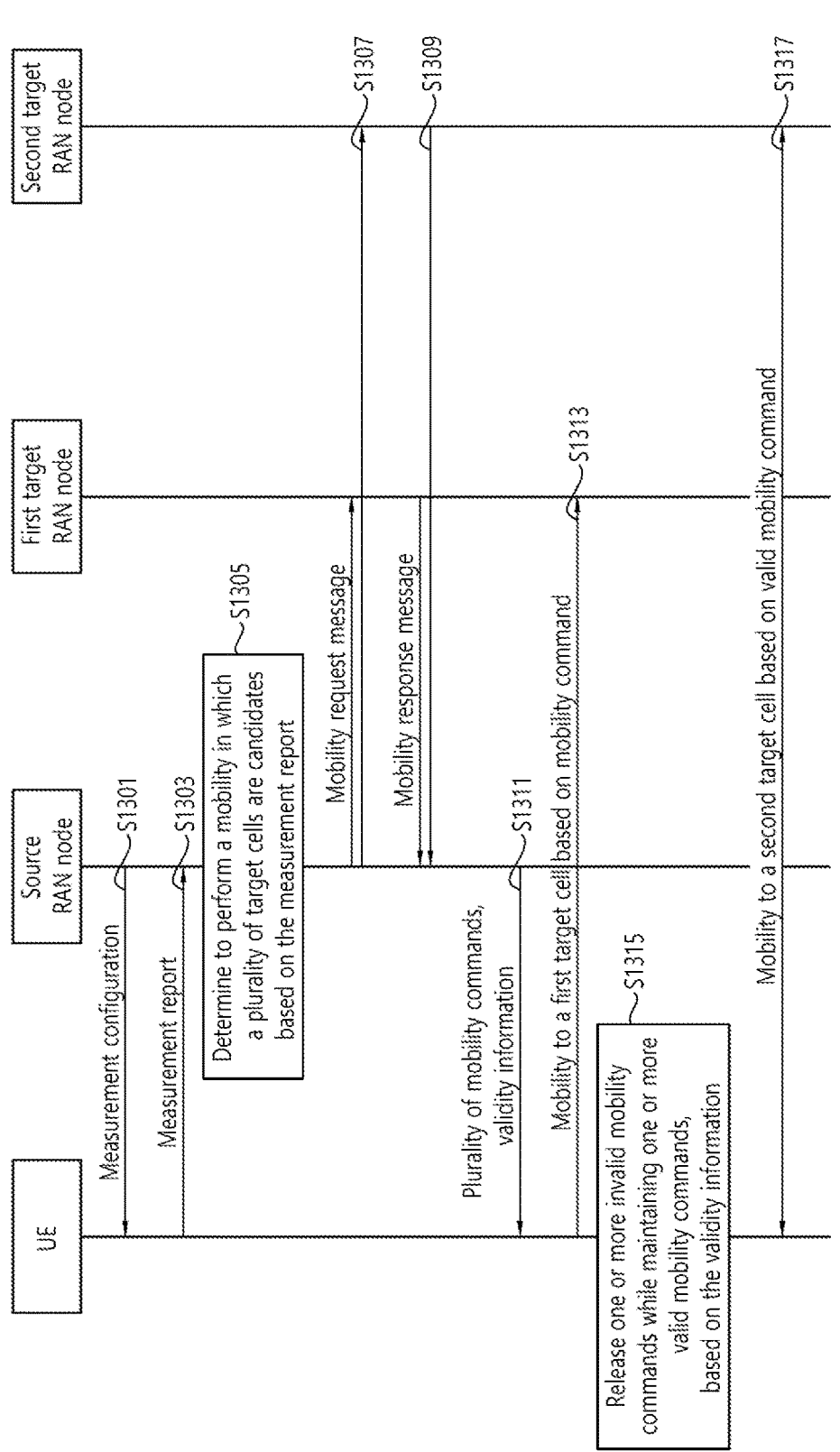
FIG. 13 shows an example of a signal flow between a UE and RAN nodes for mobility according to an embodiment of the present disclosure.

FIG. 13 shows an example of a signal flow between a UE and RAN nodes for mobility according to an embodiment of the present disclosure. The RAN nodes may comprise a source RAN node (e.g., network node related to a source cell), a first target RAN node (e.g., network node related to a first target cell), and a second target RAN node (e.g., network node related to a second target cell).

Referring to FIG. 13, in step S1301, the source RAN node may transmit, to a UE, a measurement configuration.

In step S1303, the source RAN node may receive, from the UE, a measurement report after transmitting the measurement configuration.

In step S1305, the source RAN node may determine to perform a mobility in which a plurality of target cells are candidates based on the measurement report.

In step S1307, the source RAN node may transmit, to the plurality of target cells, a request message for the mobility.

In step S1309, the source RAN node may receive, from the plurality of target cells, a response message for the request message comprising a plurality of mobility commands for the mobility. Each of the plurality of mobility commands may be related to a corresponding target cell.

In step S1311, the source RAN node may transmit, to the UE, i) the plurality of mobility commands for the mobility and ii) validity information informing whether each mobility command is valid for a next mobility after the mobility is completed.

In step S1313, the UE may perform a mobility to a first target cell, based on a mobility command related to the first target cell among the plurality of mobility commands.

After the mobility to the first target cell is completed, in step S1315, the UE may release one or more invalid mobility commands while maintaining one or more valid mobility commands, based on the validity information. Further, in step S1317, the UE may perform a mobility to a second target cell, based on a mobility command related to the second target cell among the one or more valid mobility commands.

Figure 14:
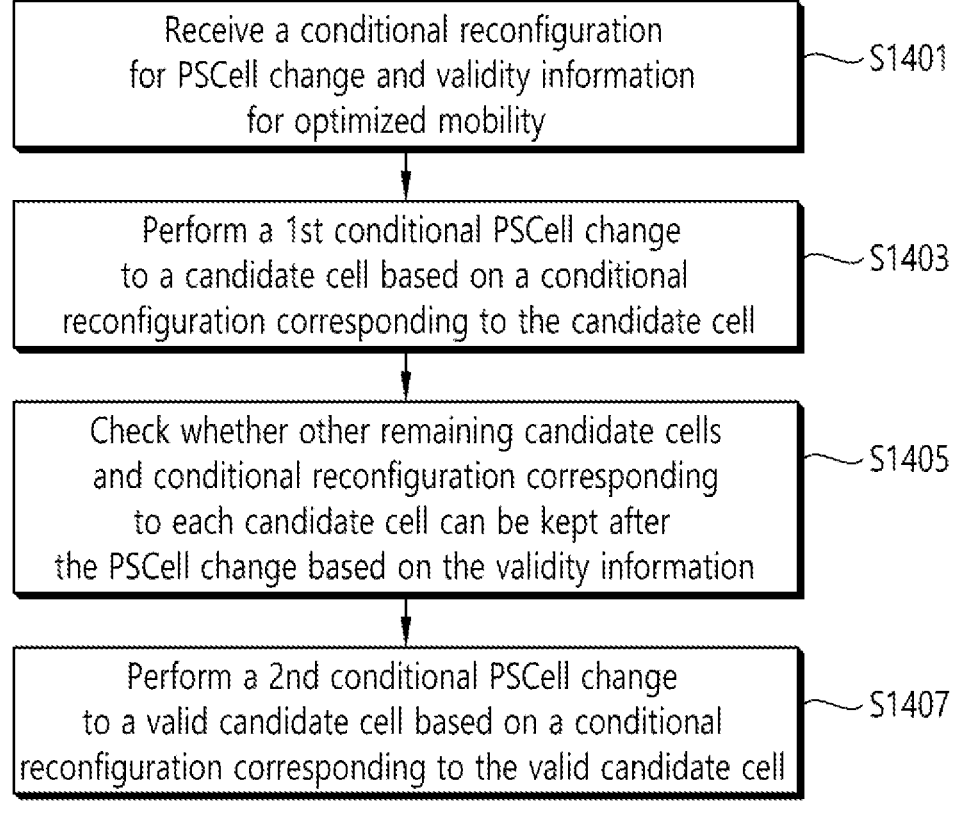
FIG. 14 shows an example of a method for an optimized mobility according to an embodiment of the present disclosure.

FIG. 14 shows an example of a method for an optimized mobility according to an embodiment of the present disclosure. The method may be performed by a UE and/or a wireless device.

Referring to FIG. 14, in step S1401, the UE may receive conditional reconfigurations for PSCell change and validity information for optimized mobility. The UE may receive RRC signaling including one or more conditional reconfigurations for PSCell change. In each conditional reconfiguration, one or more mobility commands for candidate cells and one or more mobility execution conditions corresponding to each mobility command are included. The UE may receive additional indications (i.e., validity information for optimized mobility) corresponding to each mobility command to perform the optimized mobility to keep the mobility commands after mobility from the current PSCell. The UE may create a list of candidate cells to perform the optimized mobility according to the additional indications.

In step S1403, the UE may perform a $1^{st}$ conditional PSCell change to a candidate cell based on a conditional reconfiguration corresponding to the candidate cell. The UE may execute the mobility procedures for PSCell change if at least one mobility execution condition is met for a candidate cell. The UE may apply a mobility command corresponding to the satisfied mobility execution condition that has been received in step S1401 for PSCell change. If the indication (i.e., validity information) for the optimized mobility exists for the candidate cell, the UE may change PSCell to the candidate cell and activate the candidate cell directly based on the current configuration without any further reconfiguration or command from the network.

In step S1405, the UE may check whether other remaining candidate cells and conditional reconfiguration corresponding to each candidate cell can be kept after the PSCell change based on the validity information. The validity information/additional indication may be newly included in the mobility command of the conditional reconfiguration corresponding to the candidate cell. If the indication indicates the candidate cells can be kept after PSCell change, the UE may regard the candidate cells as being allowed for the UE to perform the optimized mobility for the next PSCell change. The UE may update the list of candidate cells to perform the optimized mobility. The additional indication may also indicate to remove the conditional reconfiguration corresponding to certain/invalid candidate cells.

In step S1407, the UE may perform a $2^{nd}$ conditional PSCell change to a valid candidate cell based on a conditional reconfiguration corresponding to the valid candidate cell. After the $1^{st}$ conditional PSCell change, the UE may execute the mobility procedures for PSCell change if another mobility execution condition is met for a candidate cell. Before the $2^{nd}$ conditional PSCell change, the network may update the list for the optimized mobility via RRC signaling including the conditional reconfiguration for the next PSCell change. The UE may apply a mobility command corresponding to the satisfied mobility execution condition. If the indication for the optimized mobility exists for the candidate cell, the UE may change PSCell to the candidate cell and activate the candidate cell directly based on the current configuration without any further reconfiguration or command from the network.

The UE may check whether other remaining candidate cells and conditional reconfigurations corresponding to each candidate cell can be kept after the $2^{nd}$ PSCell change based on the additional indication. The additional indication may be also newly included in the mobility command of the conditional reconfiguration corresponding to the candidate cell for the $2^{nd}$ PSCell change.

Furthermore, the method in perspective of the UE described above in FIG. 12 may be performed by first wireless device 100 shown in FIG. 2, the wireless device 100 shown in FIG. 3, the first wireless device 100 shown in FIG. 4 and/or the UE 100 shown in FIG. 5.

More specifically, the UE comprises at least one transceiver, at least processor, and at least one computer memory operably connectable to the at least one processor and storing instructions that, based on being executed by the at least one processor, perform operations.

The operations comprise: receiving, from a network, i) a plurality of mobility commands for a mobility and ii) validity information informing whether each mobility command is valid for a next mobility after the mobility is completed—each of the plurality of mobility commands being related to a corresponding target cell; performing a mobility to a first target cell, based on a mobility command related to the first target cell among the plurality of mobility commands; and after the mobility to the first target cell is completed: releasing one or more invalid mobility commands while maintaining one or more valid mobility commands, based on the validity information; and performing a mobility to a second target cell, based on a mobility command related to the second target cell among the one or more valid mobility commands.

Furthermore, the method in perspective of the UE described above in FIG. 12 may be performed by a software code 105 stored in the memory 104 included in the first wireless device 100 shown in FIG. 4.

More specifically, at least one computer readable medium (CRM) stores instructions that, based on being executed by at least one processor, perform operations comprising receiving, from a network, i) a plurality of mobility commands for a mobility and ii) validity information informing whether each mobility command is valid for a next mobility after the mobility is completed—each of the plurality of mobility commands being related to a corresponding target cell; performing a mobility to a first target cell, based on a mobility command related to the first target cell among the plurality of mobility commands; and after the mobility to the first target cell is completed: releasing one or more invalid mobility commands while maintaining one or more valid mobility commands, based on the validity information; and performing a mobility to a second target cell, based on a mobility command related to the second target cell among the one or more valid mobility commands.

Furthermore, the method in perspective of the UE described above in FIG. 12 may be performed by control of the processor 102 included in the first wireless device 100 shown in FIG. 2, by control of the communication unit 110 and/or the control unit 120 included in the wireless device 100 shown in FIG. 3, by control of the processor 102 included in the first wireless device 100 shown in FIG. 4 and/or by control of the processor 102 included in the UE 100 shown in FIG. 5.

More specifically, an apparatus configured to operate in a wireless communication system (e.g., wireless device/UE) comprises at least processor, and at least one computer memory operably connectable to the at least one processor. The at least one processor is configured to perform operations comprising receiving, from a network, i) a plurality of mobility commands for a mobility and ii) validity information informing whether each mobility command is valid for a next mobility after the mobility is completed—each of the plurality of mobility commands being related to a corresponding target cell; performing a mobility to a first target cell, based on a mobility command related to the first target cell among the plurality of mobility commands; and after the mobility to the first target cell is completed: releasing one or more invalid mobility commands while maintaining one or more valid mobility commands, based on the validity information; and performing a mobility to a second target cell, based on a mobility command related to the second target cell among the one or more valid mobility commands.

Furthermore, the present disclosure may be applied in perspective of a network node configured to operate in a wireless communication system. The method performed by the network node comprises: transmitting, to a user equipment (UE), a measurement configuration; receiving, from the UE, a measurement report after transmitting the measurement configuration; determining to perform a mobility in which a plurality of target cells are candidates based on the measurement report; transmitting, to the plurality of target cells, a request message for the mobility; receiving, from the plurality of target cells, a response message for the request message comprising a plurality of mobility commands for the mobility, wherein each of the plurality of mobility commands is related to a corresponding target cell; and transmitting, to the UE, i) the plurality of mobility commands for the mobility and ii) validity information informing whether each mobility command is valid for a next mobility after the mobility is completed. The UE may be configured to perform a mobility to a first target cell, based on a mobility command related to the first target cell among the plurality of mobility commands. After the mobility to the first target cell is completed, the UE may be configured to release one or more invalid mobility commands while maintaining one or more valid mobility commands, based on the validity information. Further, the UE may be configured to perform a mobility to a second target cell, based on a mobility command related to the second target cell among the one or more valid mobility commands.

Furthermore, the method in perspective of the network node described above may be performed by second wireless device 100 shown in FIG. 2, the device 100 shown in FIG. 3, and/or the second wireless device 200 shown in FIG. 4.

More specifically, the network node comprises at least one transceiver, at least processor, and at least one computer memory operably connectable to the at least one processor and storing instructions that, based on being executed by the at least one processor, perform operations.

The operations comprise: transmitting, to a user equipment (UE), a measurement configuration; receiving, from the UE, a measurement report after transmitting the measurement configuration; determining to perform a mobility in which a plurality of target cells are candidates based on the measurement report; transmitting, to the plurality of target cells, a request message for the mobility; receiving, from the plurality of target cells, a response message for the request message comprising a plurality of mobility commands for the mobility, wherein each of the plurality of mobility commands is related to a corresponding target cell; and transmitting, to the UE, i) the plurality of mobility commands for the mobility and ii) validity information informing whether each mobility command is valid for a next mobility after the mobility is completed. The UE may be configured to perform a mobility to a first target cell, based on a mobility command related to the first target cell among the plurality of mobility commands. After the mobility to the first target cell is completed, the UE may be configured to release one or more invalid mobility commands while maintaining one or more valid mobility commands, based on the validity information. Further, the UE may be configured to perform a mobility to a second target cell, based on a mobility command related to the second target cell among the one or more valid mobility commands.

The valid timing alignment (TA) timer remaining upon SCG reactivation may be an important factor for RACH-less activation. The reason the UE sends the SCG failure information message may be to obtain reconfiguration for RACH-less activation.

Through this invention, the UE may obtain a chance to restart the TA timer upon reception of recovery configuration so that the UE can initiate the RACH-less activation, i.e. fast SCG activation.

The present disclosure can have various advantageous effects.

For example, based on the validity information, the UE may identify one or more cells among all neighbor cells in a cell list to which optimized mobility is possible without receiving an additional signaling for the cell list.

For example, in case of conditional mobility, the UE may prevent mobility failure due to an optimized mobility to a wrong cell when the UE needs to perform a mobility before receiving an update from a network.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method comprising:

receiving, from a network, i) a plurality of mobility commands and ii) validity information informing whether each mobility command is valid for a next mobility, wherein each of the plurality of mobility commands is related to a corresponding candidate cell, wherein the validity information is related to each of the plurality of mobility commands, and wherein the validity information related to each of the plurality of mobility commands informs whether each mobility command related to a neighbor cell of the corresponding candidate cell is valid for a next mobility after a mobility to the corresponding candidate cell based on a corresponding mobility command is completed;

applying a mobility command related to a first candidate cell among the plurality of mobility commands; and after applying the mobility command related to the first candidate cell:

i) releasing one or more invalid mobility commands while ii) maintaining one or more valid mobility commands, based on the validity information; and iii) applying a mobility command related to a second candidate cell iv) among the one or more valid mobility commands.

2. The method of claim 1, wherein first validity information for the mobility command related to the first candidate cell informs whether each mobility command related to a neighbor cell of the first candidate cell is valid for a next mobility after applying the mobility command related to the first candidate cell, and wherein second validity information for the mobility command related to the second candidate cell informs whether each mobility command related to a neighbor cell of the second candidate cell is valid for a next mobility after applying the mobility command related to the second candidate cell.

3. The method of claim 2, wherein the first validity information informs one or more first valid mobility commands related to one or more neighbor cells of the first candidate cell, and wherein the second validity information informs one or more second valid mobility commands related to one or more neighbor cells of the second candidate cell.

4. The method of claim 3, wherein at least part of the one or more first valid mobility commands is different from the one or more second valid mobility commands.

5. The method of claim 1, wherein the validity information is included in each of the plurality of mobility commands.

6. The method of claim 1, wherein the validity information comprises a frequency list or a cell list including at least one candidate cell to which related mobility command is valid for a next mobility after a mobility to another candidate cell is completed.

7. The method of claim 6, wherein the frequency list comprises a list of measurement object identities (IDs), and wherein each measurement object ID identifies each of frequencies including the at least one candidate cell in the frequency list.

8. The method of claim 6, wherein the cell list comprises a list of mobility command identities (IDs), and wherein each mobility command ID identifies each of the at least one candidate cell in the cell list.

9. The method of claim 1, wherein the method is performed by a user equipment (UE) in communication with at least one of a mobile device, a network, or autonomous vehicles other than the UE.

10. The method of claim 1, wherein the mobility is an optimized mobility which includes a conditional primary cell (PCell) change, a conditional primary secondary cell (PSCell) addition (CPA) or a conditional PSCell change (CPC) without reconfiguration and/or re-initialization.

11. The method of claim 1, wherein a list for the mobility is managed for each of the plurality of mobility commands based on the validity information for the related mobility command.

12. The method of claim 11, wherein, before performing the mobility from the network to the first candidate cell, the list for the mobility is created.

13. The method of claim 12, wherein, after performing the mobility from the network to the first candidate cell, the list for the mobility is updated based on the validity information related to the mobility command related to the first candidate cell, and wherein the list comprises the second candidate cell.

14. A user equipment (UE) comprising: at least one transceiver;

at least one processor; and at least one computer memory operably connectable to the at least one processor and storing instructions that, based on being executed by the at least one processor, perform operations comprising:

receiving, from a network, i) a plurality of mobility commands and ii) validity information informing whether each mobility command is valid for a next mobility, wherein each of the plurality of mobility commands is related to a corresponding candidate cell, wherein the validity information is related to each of the plurality of mobility commands, and wherein the validity information related to each of the plurality of mobility commands informs whether each mobility command related to a neighbor cell of the corresponding candidate cell is valid for a next mobility after a mobility to the corresponding candidate cell based on a corresponding mobility command is completed;

applying a mobility command related to a first candidate cell among the plurality of mobility commands; and after applying the mobility command related to the first candidate cell:

i) releasing one or more invalid mobility commands while maintaining one or more valid mobility commands, based on the validity information; and ii) applying a mobility command related to a second candidate cell among the one or more valid mobility commands.

15. A method comprising:

transmitting, to a user equipment (UE), a measurement command;

receiving, from the UE, a measurement report after transmitting the measurement command;

determining to perform a mobility in which a plurality of target cells are candidates based on the measurement report;

determining to perform a mobility in which a plurality of candidate cells are candidates based on the measurement report;

transmitting, to the plurality of candidate cells, a request message for the mobility; receiving, from the plurality of candidate cells, a response message for the request message comprising a plurality of mobility commands for the mobility, wherein each of the plurality of mobility commands is related to a corresponding candidate cell; and transmitting, to the UE, i) the plurality of mobility commands for the mobility and ii) validity information informing whether each mobility command is valid for a next mobility, wherein the validity information is related to each of the plurality of mobility commands, and wherein the validity information related to each of the plurality of mobility commands informs whether each mobility command related to a neighbor cell of the corresponding candidate cell is valid for a next mobility after a mobility to the corresponding candidate cell based on a corresponding mobility command is completed, wherein the UE is configured to apply a mobility command related to a first candidate cell among the plurality of mobility commands, and wherein, after applying the mobility command related to the first candidate cell, the UE is configured to:

release one or more invalid mobility commands while maintaining one or more valid mobility commands, based on the validity information; and apply a mobility command related to a second candidate cell among the one or more valid mobility commands.

* * * * *